US012405574B2

(12) United States Patent
Beugin et al.

(10) Patent No.: US 12,405,574 B2
(45) Date of Patent: Sep. 2, 2025

(54) NATURAL ESCAPEMENT FOR HOROLOGICAL MOVEMENT AND HOROLOGICAL MOVEMENT COMPRISING SUCH AN ESCAPEMENT

(71) Applicant: Montres Breguet S.A., L'Abbaye (CH)

(72) Inventors: Stéphane Beugin, Les Rousses (FR); Jérôme Macé, Le Pont (CH)

(73) Assignee: Montres Breguet S.A., L'Abbaye (CH)

(*) Notice: Subject to any disclaimer, the term of this patent is extended or adjusted under 35 U.S.C. 154(b) by 499 days.

(21) Appl. No.: 18/051,912

(22) Filed: Nov. 2, 2022

(65) Prior Publication Data

US 2023/0251604 A1 Aug. 10, 2023

(30) Foreign Application Priority Data

Dec. 20, 2021 (EP) .................................... 21215870

(51) Int. Cl.
*G04B 15/08* (2006.01)
*G04B 15/14* (2006.01)

(52) U.S. Cl.
CPC ............. *G04B 15/08* (2013.01); *G04B 15/14* (2013.01)

(58) Field of Classification Search
CPC ........ G04B 15/00; G04B 15/06; G04B 15/08; G04B 15/14
See application file for complete search history.

(56) References Cited

U.S. PATENT DOCUMENTS 2,690,048 A 9/1954 Smith
7,604,395 B2 * 10/2009 Cabezas Jurin ....... G04B 15/06 368/127

(Continued)

FOREIGN PATENT DOCUMENTS

CH 286913 A 11/1952
CH 712 631 A1 12/2017

(Continued)

OTHER PUBLICATIONS

European Search Report issued May 20, 2022 in European Application 21215870.3 filed on Dec. 20, 2021 (with English Translation of Categories of Cited Documents), 3 pages.

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A natural escapement for horological movement including a balance that moves from a first extreme position to a second extreme position and vice versa by passing through a middle locking position, this balance including a balance wheel on an arbor of which is adjusted a balance plate, the natural escapement also including a first escape wheel set driven by a wheel set of the train of the horological movement and driving in turn a second escape wheel set, the first and second escape wheel sets forming a kinematic chain cooperating with an anchor, the balance plate carrying a second impulse pallet-stone which receives a driving impulse from the first escape wheel set during the first alternation, and a first impulse pallet-stone which receives a driving impulse from the second escape wheel set during the second alternation.

23 Claims, 10 Drawing Sheets

(56) References Cited

U.S. PATENT DOCUMENTS

| | | | | |
|---|---|---|---|---|
| 8,308,346 | B2 * | 11/2012 | Conus .................... | G04B 15/08 368/131 |
| 11,402,804 | B2 * | 8/2022 | Favre ..................... | G04B 15/14 |
| 12,055,894 | B2 * | 8/2024 | Zaugg .................. | G04B 17/063 |
| 2015/0177690 | A1 * | 6/2015 | Di Domenico ........ | G04B 17/06 368/126 |
| 2016/0266546 | A1 * | 9/2016 | Di Domenico .......... | G04C 5/00 |
| 2023/0185240 | A1 * | 6/2023 | Zaugg .................... | G04B 15/08 |

FOREIGN PATENT DOCUMENTS

| | | | |
|---|---|---|---|
| CN | 112368648 | A | 2/2021 |
| CN | 113608424 | A | 11/2021 |
| EP | 2565730 | A1 | 3/2013 |
| JP | 2008268209 | A | 11/2008 |
| JP | 2012168172 | A | 9/2012 |
| WO | 2017013611 | A1 | 1/2017 |

OTHER PUBLICATIONS

Chinese Office Action issued in Chinese Patent Application No. 202211648398.0 on Apr. 21. 2025.

* cited by examiner

NATURAL ESCAPEMENT FOR HOROLOGICAL MOVEMENT AND HOROLOGICAL MOVEMENT COMPRISING SUCH AN ESCAPEMENT

CROSS-REFERENCE TO RELATED APPLICATION

This application claims priority to European Patent Application No. 21215870.3 filed on Dec. 20, 2021, the entire disclosure of which is hereby incorporated herein by reference.

TECHNICAL FIELD OF THE INVENTION

The present invention relates to a natural escapement for horological movement also known under its name tangential impulse escapement. The present invention more particularly relates to a natural escapement protected against the damages that may be caused by a premature release of the escapement impulse in the absence of the balance. The present invention also relates to a horological movement comprising such an escapement.

TECHNOLOGICAL BACKGROUND

The principle of the natural escapement was invented by Abraham Louis Breguet at the beginning of the 19th Century. The advantage of Breguet's natural escapement is particularly that it is a free escapement insofar as the balance is only disturbed by the operation of the escapement over a small fraction of its oscillation. The advantage of Breguet's natural escapement is also that it gives with each alternation a direct and tangential impulse to the balance. In other words, energy is transferred directly from the escape wheel to the balance, without passing through an anchor. Moreover, the transmission of energy only takes place tangentially, so that the frictions generated by the operation of this escapement are limited. Unlike a detent escapement, a natural escapement does not have a coup perdu in its function for maintaining oscillations of the balance; it delivers a similar impulse with each alternation, in a symmetrical and more uniform manner, so that the losses of mechanical energy by coup perdu are eliminated. All of these qualities thus make the natural escapement potentially one of the most efficient.

Breguet nevertheless subsequently discovered that the natural escapement that he had invented had certain drawbacks foremost of which mention may be made of the fact that the last escape wheel is not under the tension of the train when the first wheel gives the impulse or when the latter is locked. The various plays of the gears and the manufacturing quality of the various components incorporated into the composition of a Breguet natural escapement may thus cause an incorrect positioning of the last escape wheel and, consequently, a malfunction of the escapement accompanied with parasitic noises. Furthermore, as the escape wheel is free, its position is unstable, so that the operational safety of such a natural escapement is poor.

Of course, many improvements have been made to the original Breguet natural escapement to attempt to overcome the above-mentioned drawbacks. Nevertheless, despite the efforts of successive watch manufacturers, difficulties remain. Some watchmakers have thus proposed to superimpose the two escape wheels, a solution which, of course, increases the thickness of the movement and makes it difficult to integrate such a movement into a watch case. Other watch manufacturers have for their part proposed to position the anchor between the two escape wheels, in the plane of the latter. Here too, such a solution is bulky, this time in the plane of the movement. In addition, whether the escape wheels are superimposed or the anchor is disposed between the two escape wheels, it has been realised upon use that the watchmakers had difficulties in accessing the miscellaneous components of the escapement, in particular when this concerned adjusting the depth of penetration of the teeth of the first and of the second escape wheel with the entry and exit pallets of the anchor. In addition, when the watchmaker carries out control and regulation manipulations and when for this he removes the balance wheel, it may transpire that a release of the impulse occurs while neither of the two impulse pallet-stones carried by the balance plate is in the perimeter of rotation of one or other of the escape wheels to ensure the escapement function. In such cases, the escape wheels are not retained by the escapement function and may rotate uncontrollably. This then causes at best a loss of the timekeeper function with an undesired advance, and at worst a sudden stop after acceleration of the train in one or other of its locking positions that may lead to a deterioration of the components of the train and of the escapement.

SUMMARY OF THE INVENTION

The aim of the present invention is to remedy the above-mentioned problems as well as others also by providing a natural escapement for a horological movement that is protected against the effects of a release of the escapement function when the balance is not present.

To this end, the present invention relates to a natural escapement for horological movement carrying out a succession of operating cycles each consisting of a first and of a second alternation of a balance during which the balance moves from a first extreme position to a second extreme position by passing through a middle rest position, then from its second extreme position to its first extreme position by passing again a second time through its middle rest position, this balance comprising a balance wheel on an arbor of which is adjusted a balance plate, this natural escapement comprising a first escape wheel set having at least one first toothing, this first escape wheel set, arranged to be driven by a wheel set of the train of the horological movement, driving in turn a second escape wheel set having at least one second toothing, the first and second escape wheel sets forming a kinematic chain arranged to cooperate with an anchor capable of pivoting about an anchor-staff, the balance plate causing the anchor to pivot with each of the first and second alternations, this anchor being arranged to lock respectively the first and the second escape wheel set temporarily during the second and first alternations of an operating cycle, the anchor further comprising a first, respectively a second safety lever, these first and second safety levers being arranged so that, in the absence of the balance, one or other of the second and first escape wheel sets, by driving the second or the first safety lever, causes the anchor to pivot to ensure the locking of the first or of the second escape wheel set by abutment of this first or of this second escape wheel set on the portion of the anchor that ensures the function of a stop pallet-stone of this first or of this second escape wheel set during normal operation of the escapement, the first and second safety levers being arranged so as not to be in contact with the first and second escape wheel sets during normal operation of the escapement during which it is the balance plate that causes the anchor to pivot.

According to special embodiments of the invention:

at least one first lever, pivoted about a pivot pin, being connected to the first arm of the anchor via at least one pivoting articulation, the anchor comprising a second lever that extends its second arm, these first and second levers being arranged to lock respectively the first and second escape wheels temporarily during the second and first alternations of an operating cycle, the pivoting displacement of the first and second levers being limited;

the first and second levers are pivoted about respective pivot pins and are connected respectively to the first and second arms of the anchor via at least one pivoting articulation;

the pivoting articulations are each formed of a catch that protrudes in an oblong opening;

the pivoting displacement of the anchor is limited by first and second limit banking-pins;

the first and second limit banking-pins are pegs;

the first and second banking-pins are machined in a fixed element of the horological movement;

the first and second limit banking-pins are eccentrics;

the first lever is made of one part and has a geometry that ensures the function of a first stop pallet-stone to temporarily lock the first escape wheel during the second alternation, and the second lever is made of one part and has a geometry that ensures the function of a second stop pallet-stone to temporarily lock the second escape wheel during the first alternation;

the first escape wheel comprises a first drive toothing whereby it meshes with a second drive toothing of the second escape wheel, and the first and second escape wheels each comprise an impulse and locking toothing whereby they provide a direct and tangential driving impulse to the balance plate, the drive and impulse and locking toothings of each of the first and second escape wheels extending in a single plane or in two parallel planes;

the anchor comprises a fork formed of a first and of a second horn, the balance plate coming to abut by its balance pin against the second horn of the fork and causing this anchor to pivot in a first direction during the first alternation, and against the first horn during the second alternation, causing the anchor to pivot in a second direction opposite to the first;

the fork carries a dart that cooperates with the balance plate to prevent the accidental movements of the fork during a period called supplementary arc;

the first and second escape wheels are each one-piece;

a reduction wheel set is disposed between the wheel set of the train of the horological movement and the first escape wheel.

The invention also relates to a horological movement comprising a natural escapement of the type described above.

Thanks to these features, the present invention provides a natural escapement protected against the damages that may be created by a premature release of the impulse. Indeed, by teaching to provide the first and second arms of the anchor with a first and second safety lever, the locking of the first escape wheel set is advantageously ensured when in the absence of the balance plate, this locking is not ensured by the cooperation between this balance plate and the anchor. Indeed, it is understood that in the absence of the balance plate, the second escape wheel set is not retained by the escapement function and may therefore rotate uncontrollably, which may cause a loss of the timekeeping function with an undesired advance, or even a sudden stop after acceleration of the train of the horological movement that may lead to a deterioration of the components of the train and of the escapement. To achieve this objective, the first and second safety levers are arranged so that, in the absence of the balance, the second escape wheel set, by action on the second safety lever, causes the second arm of the anchor, the anchor and the first arm of the anchor to pivot to ensure the locking of the first escape wheel set on the portion of this anchor that, usually, that is to say when the balance plate is present, ensures the function of a stop pallet-stone to temporarily lock the first escape wheel set during an operating cycle of the natural escapement. Of course, the first and second safety levers are designed so as not to be in contact with the first and second escape wheel sets during normal operation of the escapement during which it is the balance plate that causes the anchor to pivot. Likewise, it will be understood that the symmetrical situation is also possible, namely that by pivoting of the anchor controlled by the first escape wheel set, the locking of the second escape wheel set is ensured by abutment against the portion of this anchor that, usually, ensures the function of a stop pallet-stone to temporarily lock the second escape wheel set during an operating cycle of the natural escapement.

BRIEF DESCRIPTION OF THE FIGURES

Other features and advantages of the present invention will become more apparent from the following detailed description of one embodiment of a natural escapement according to the invention, this example being given for purely illustrative and non-limiting purposes only in connection with the appended drawing wherein.

DETAILED DESCRIPTION OF THE INVENTION

The present invention proceeds from the general inventive idea that consists in providing the first and second arms of the anchor of a natural escapement, also known under its name tangential impulse escapement, with a first and with a second safety lever in the aim of guaranteeing that, if the watchmaker, for any reason, needs to remove the balance wheel, an unexpected release of the rotation of the first and second escape wheel sets is stopped immediately by bringing one of the first and second escape wheel sets into its locking position. To this end, the safety levers are arranged such that, when the balance wheel is removed, the second escape wheel set, by action on the second safety lever, pivots the anchor and the first arm of this anchor to make it possible for the first escape wheel set to immobilise in its locking position pressed against the portion of this anchor that, usually, that is to say when the balance plate is present, ensures the function of a stop pallet-stone to temporarily lock the first escape wheel set during an operating cycle of the natural escapement.

Figure 1:
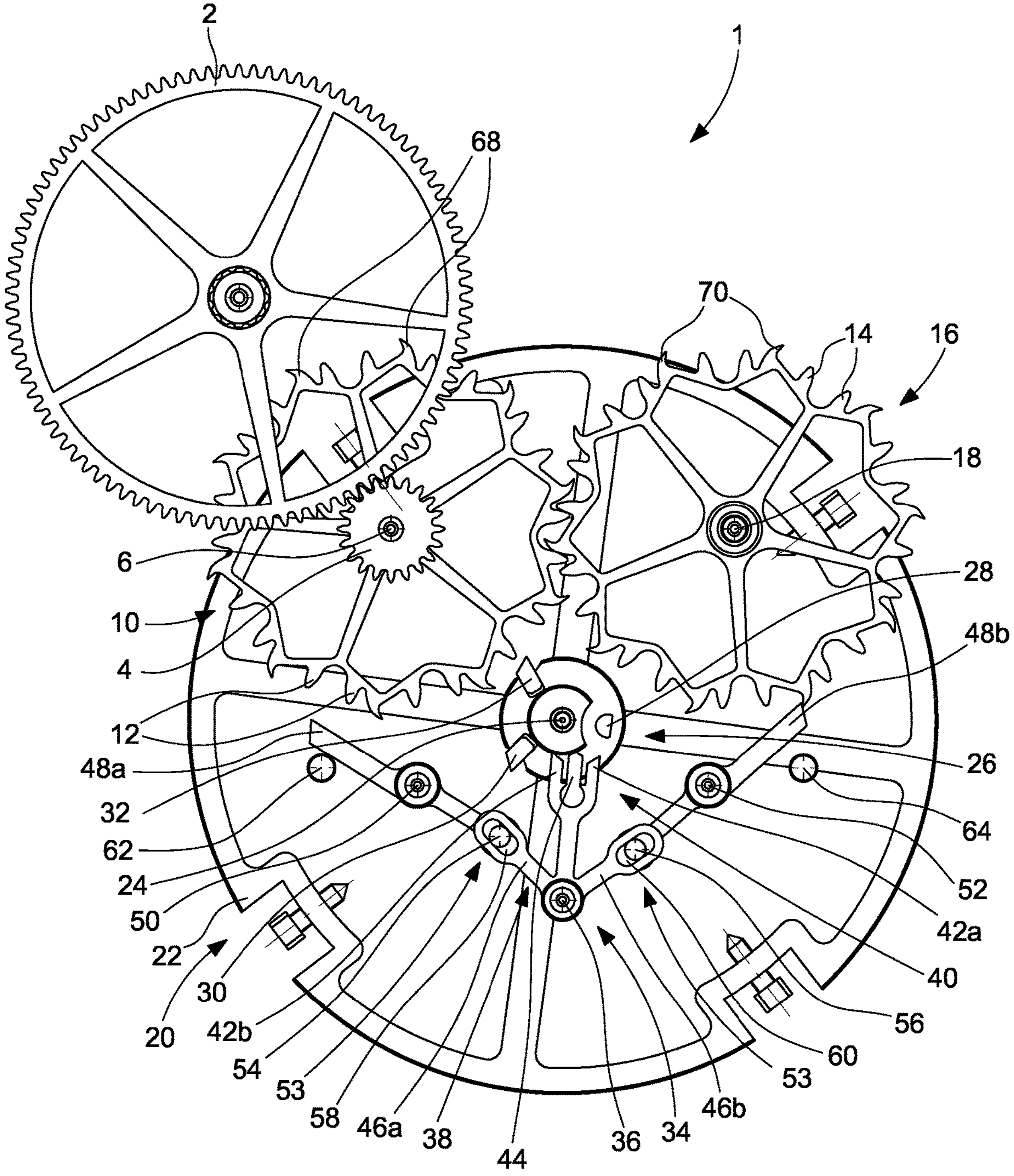
FIG. 1 is an overview from the top of a natural escapement in its locking position wherein the second escape wheel abuts against the second lever.

Designated as a whole by the general numerical reference 1, the natural escapement is shown in its locking position in FIG. 1. This natural escapement 1 is arranged to be driven by a wheel set of the train of the horological movement, for example a second wheel 2 that, according to a preferred but not limiting embodiment, meshes with a pinion 4 fixedly mounted on an arbor 6 of a first escape wheel set comprising a first escape wheel 10. This first escape wheel 10 meshes for its part via a first drive toothing 12 with a second drive toothing 14 of a second escape wheel set comprising a second escape wheel 16 that pivots about an arbor 18.

The natural escapement 1 also comprises a balance 20 that includes a balance wheel 22 on an arbor 24 of which is adjusted a balance plate 26. This balance plate 26 carries a balance pin 28 as well as a first and a second impulse pallet-stone 30 and 32 the respective roles of which will be described below.

The natural escapement 1 also comprises an anchor 34 pivoted about an anchor-staff 36. This anchor 34 includes an anchor body 38 that carries a fork 40 formed of a first and of a second horn 42*a* and 42*b* as well as of a dart 44. This dart 44 cooperates with the balance plate 26 in the aim of preventing the accidental movements of the fork 40 during the periods commonly called supplementary arcs, periods during which the balance plate 26 is distant to its middle rest position called angle of lift.

As can be seen upon examining FIG. 1, the anchor body 38 includes a first and a second arm 46*a* and 46*b* that are preferably but not in a limiting manner arranged symmetrically on either side of the fork 40. According to one embodiment given purely by way of illustration only in FIGS. 8 to 10, first and second levers 48*a*, 48*b*, pivoted about respective pivot pins 50 and 52, are connected to the first and second arms 46*a*, 46*b* of the anchor body 38 via a pivoting articulation 53. In this embodiment, the first lever 48*a* is made of one part and has a geometry that ensures the function of a first stop pallet-stone to temporarily lock the first escape wheel 10 during an operating cycle of the natural escapement 1, and the second lever 48*b* has a geometry that ensures the function of a second stop pallet-stone to temporarily lock the second escape wheel 16 during the same operating cycle of the natural escapement 1.

According to the embodiment shown in the drawing, the first and second levers 48*a*, 48*b* each carry a catch 54, respectively 56, that protrudes in an oblong opening 58, respectively 60, made in the first and second arms 46*a*, 46*b* of the anchor body 38. Of course, the catches 54 and 56 could be carried by the first and second arms 46*a*, 46*b*, and the oblong openings 58, 60 could be made in the first and second levers 48*a*, 48*b*. Thus, by engaging the catches 54, 56 in the oblong openings 58, 60, the first and second levers 48*a*, 48*b* are capable of pivoting in relation to the first and second arms 46*a*, 46*b* of the anchor body 38.

In the embodiment of the natural escapement 1 illustrated in the drawing, it is assumed that the second wheel 2 that supplies the natural escapement 1 with the energy necessary for its operation rotates in the clockwise direction. Consequently, the second wheel 2 tends to rotate the pinion 4 and the first escape wheel 10 on the arbor 6 of which is fixed the pinion 4 in the anti-clockwise direction, and the second escape wheel 16 in the clockwise direction.

An operating cycle of the natural escapement 1 comprises two alternations during which the balance plate 26 will go successively from a first extreme position to a second extreme position by passing through a middle rest position, then from its second extreme position to its first extreme position by passing again a second time through its middle rest position. Thus, at the beginning of a cycle (see FIG. 1), the balance plate 26 rotates towards its middle rest position by rotating in the clockwise direction, whereas the second escape wheel 16 is pressed on the second lever 48*b*.

Figure 2:
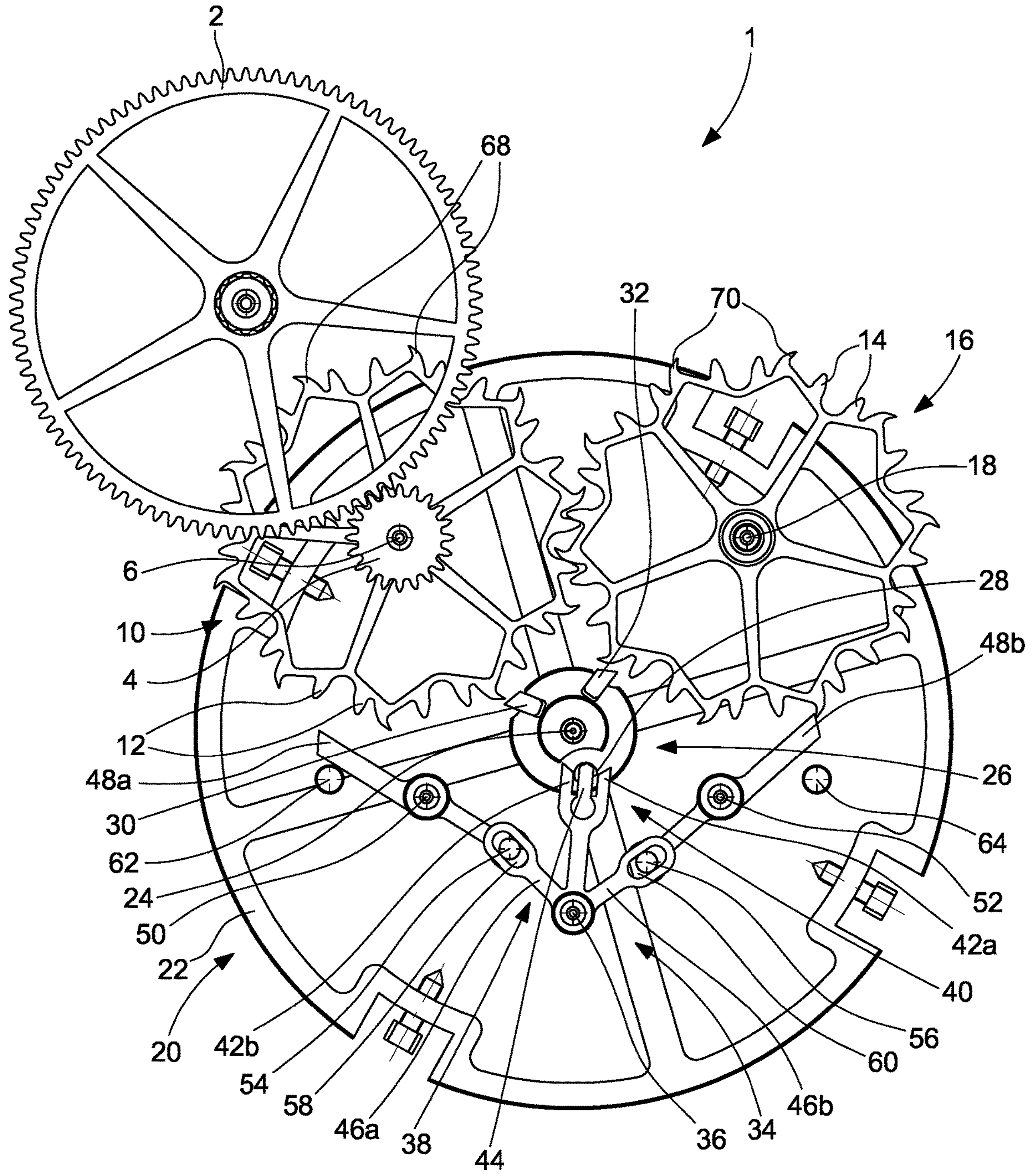
FIG. 2 is a top view of the natural escapement in its position wherein the balance pin comes into contact with the second horn of the fork, which will cause the beginning of unlocking of the second escape wheel from its engagement with the second lever.

At a given moment of its movement illustrated in FIG. 2, the balance plate 26 arrives in a position wherein it abuts by its balance pin 28 against the second horn 42*b* of the fork 40 and starts to cause the anchor 34 to pivot in the anti-clockwise direction. The pivoting of the anchor 34 in the anti-clockwise direction has the effect of starting to release the second escape wheel 16 from its engagement with the second lever 48*b*, which will make it possible for the second wheel 2 to drive, via the first escape wheel 10, the second escape wheel 16 in the clockwise direction.

Figure 3:
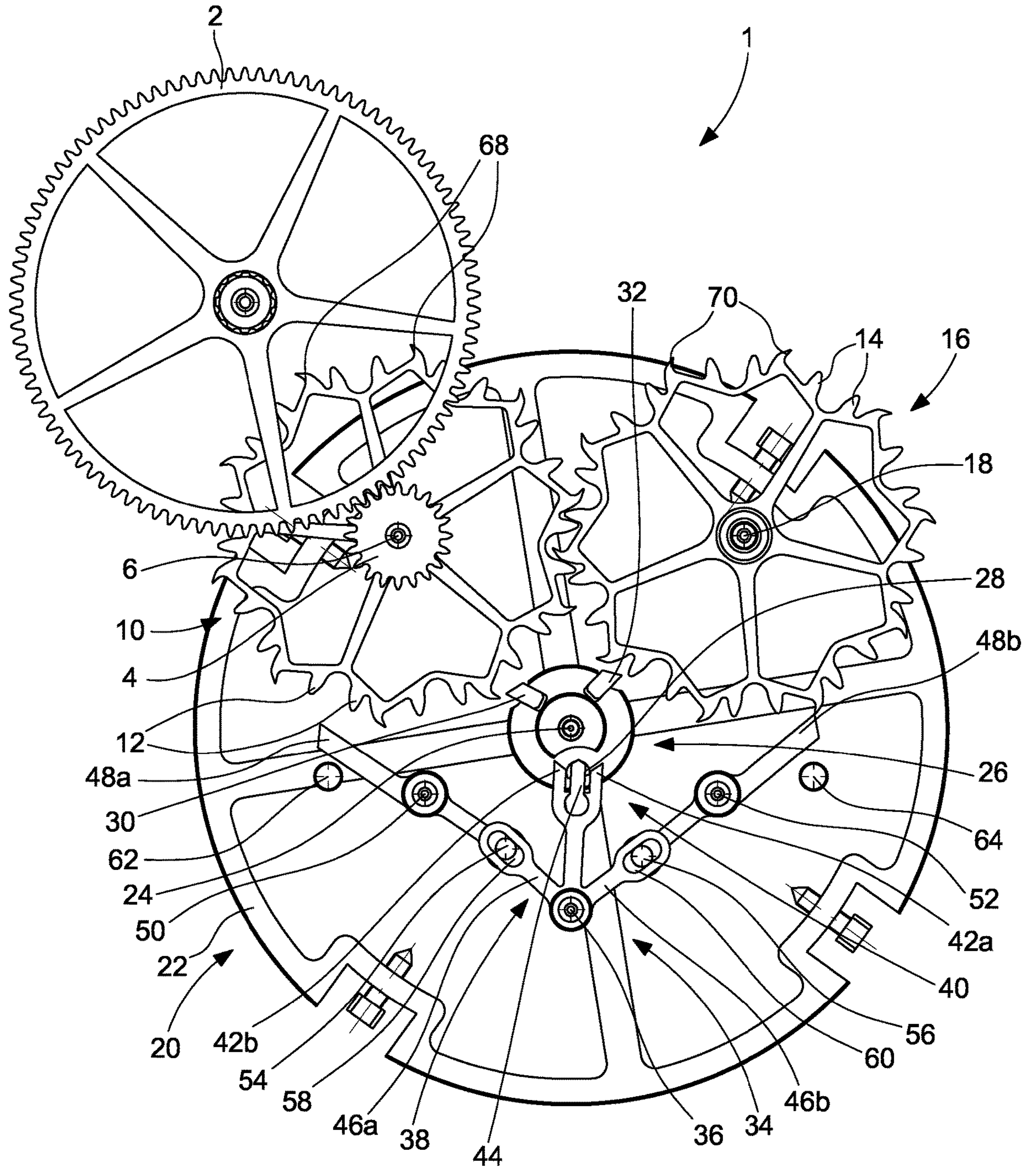
FIG. 3 is a top view of the natural escapement in its position wherein the balance plate drives the anchor and the levers, which causes the beginning of the first drop by unlocking the second escape wheel from its engagement with the second lever.

In FIG. 3, the natural escapement 1 is in a position wherein the balance plate 26 drives the anchor 34, which causes the beginning of the first drop by unlocking the second escape wheel 16 from its engagement with the second lever 48*b*. "Drop" means the periods of operation of the natural escapement 1 according to the invention during which the first and second escape wheels 10 and 16 are neither in contact with one or other of the first and second levers 48*a*, 48*b*, nor with one or other of the first and second impulse pallet-stones 30, 32.

Figure 4:
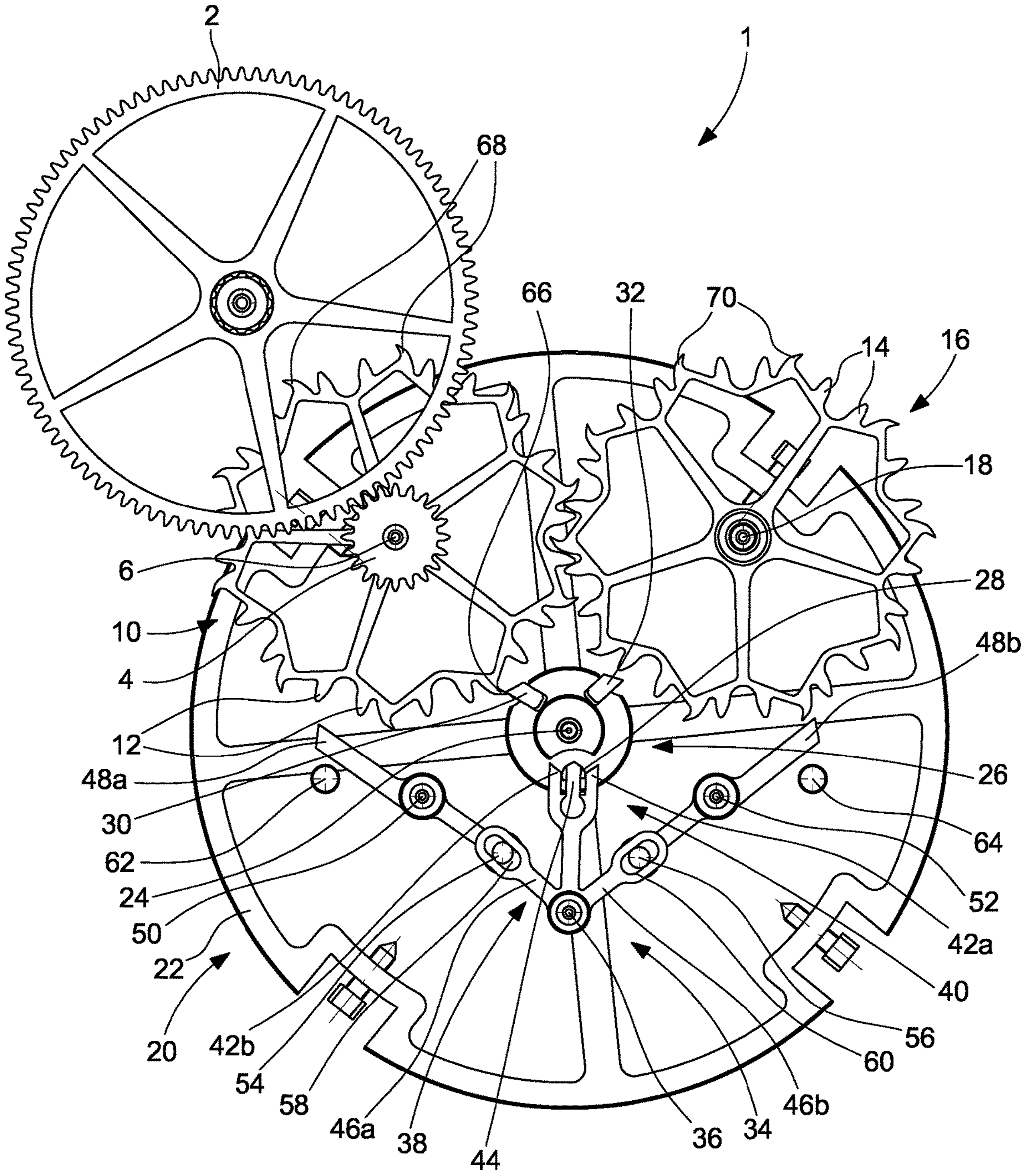
FIG. 4 is a top view of the natural escapement in its position wherein the first escape wheel comes to abuts against the first impulse pallet-stone and starts to give an impulse to the balance plate, which marks the end of the first drop.

It will be understood that at the same time as the first escape wheel drives the second escape wheel 16 by pivoting in the clockwise direction, the first escape wheel 10 also starts to give a driving impulse to the balance plate 26 via a tooth 66 of an impulse and locking toothing 68 that drives the first impulse pallet-stone 30 (see FIG. 4). This driving impulse is referred to as direct and tangential because it is given directly by the first escape wheel to the balance plate 26 and that the path of the tooth 66 catches that of the first impulse pallet-stone 30 of the balance plate 26 tangentially, which makes a contact almost on time and without friction possible. Moreover, it will be noted that the tooth 66 of the first escape wheel 10 coming into contact with the first impulse pallet-stone 30 of the balance plate 26 marks the end of the first drop.

Figure 5:
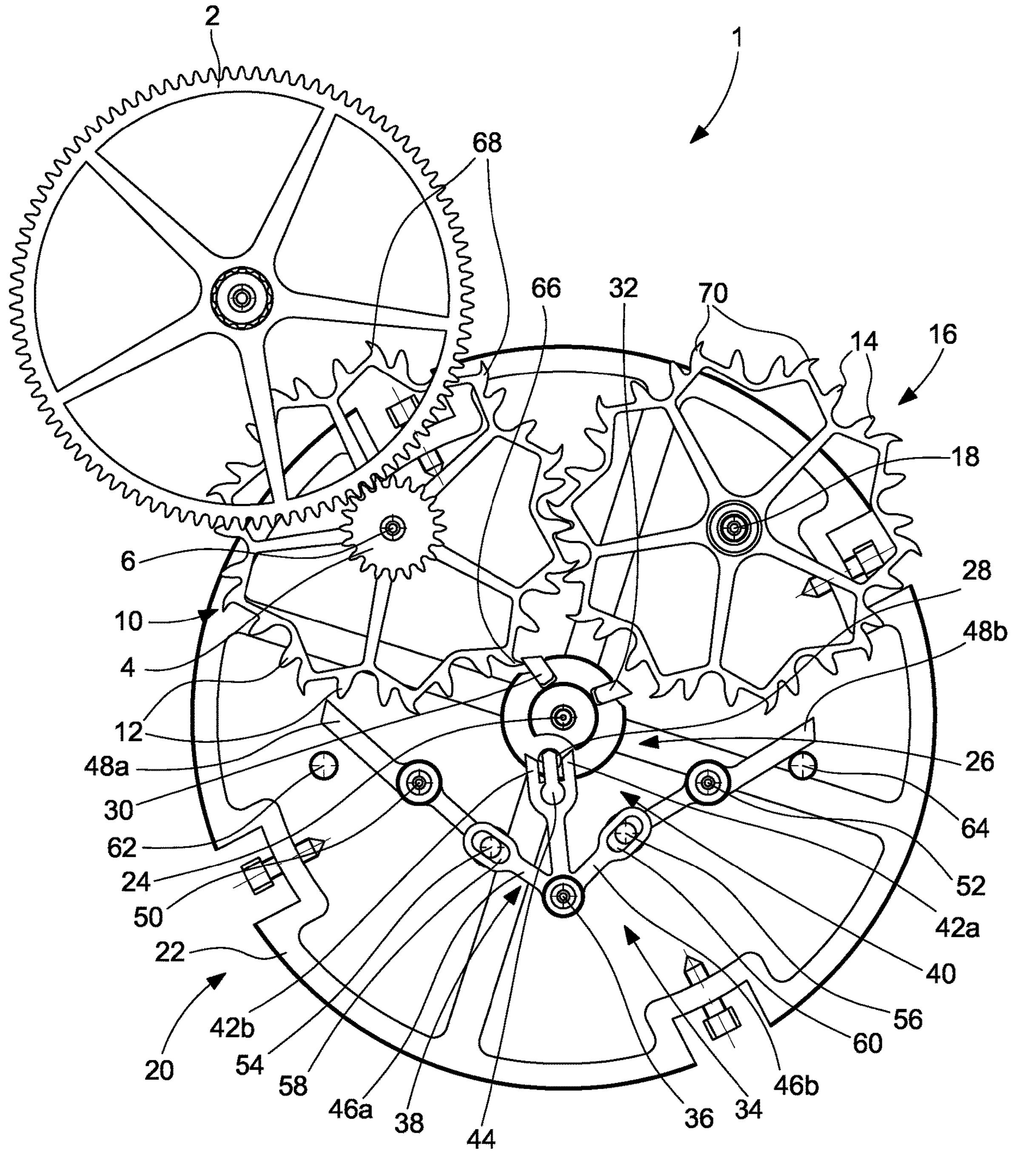
FIG. 5 is a top view of the natural escapement in its position wherein the first escape wheel imparts the impulse to the balance plate whereas the second lever comes to abut against the second limit banking-pin.

FIG. 5 is a top view of the natural escapement 1 in its position wherein the first escape wheel 10 imparts the impulse to the balance plate 26, whereas the second lever 48*b* pivots about its pivot pin 52 and comes to press against the second limit banking-pin 64. This movement is controlled by the anchor 34 which, driven by the balance pin 28, pivots about its anchor-staff 36 in the anti-clockwise direction.

Figure 6:
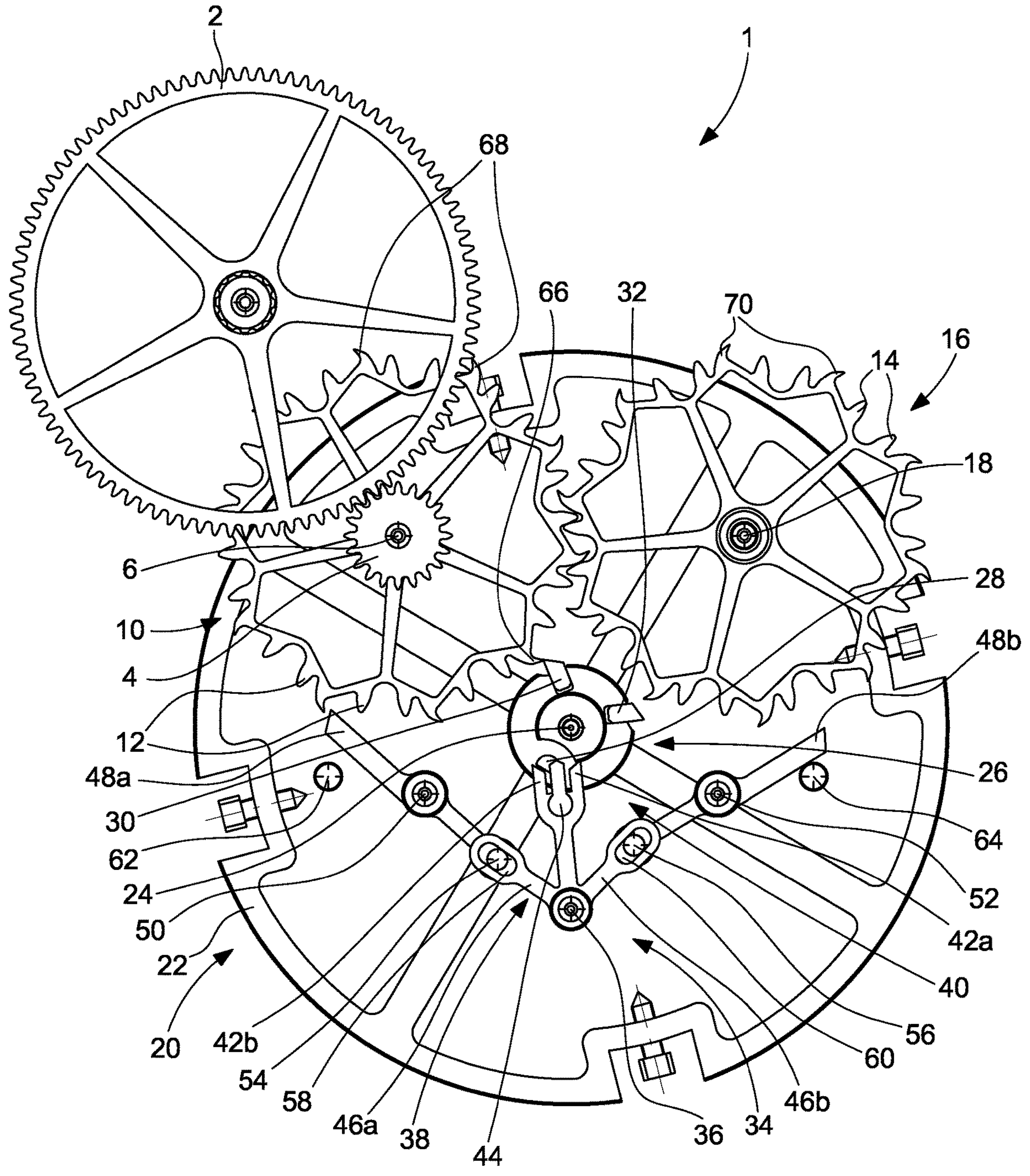
FIG. 6 is a top view of the natural escapement in its position wherein the first escape wheel finishes imparting an impulse to the balance plate, which marks the beginning of the second drop, whereas the second lever is pressed on the second limit banking-pin.

In FIG. 6, the first escape wheel 10 finishes by imparting an impulse to the balance plate 26, which marks the beginning of the second drop. Indeed, it can be seen that the tooth 66 of the first escape wheel 10 will no longer be in contact with the first impulse pallet-stone 30 of the balance plate 26. Moreover, the second lever 48*b* is pressed on the second limit banking-pin 64.

Figure 7:
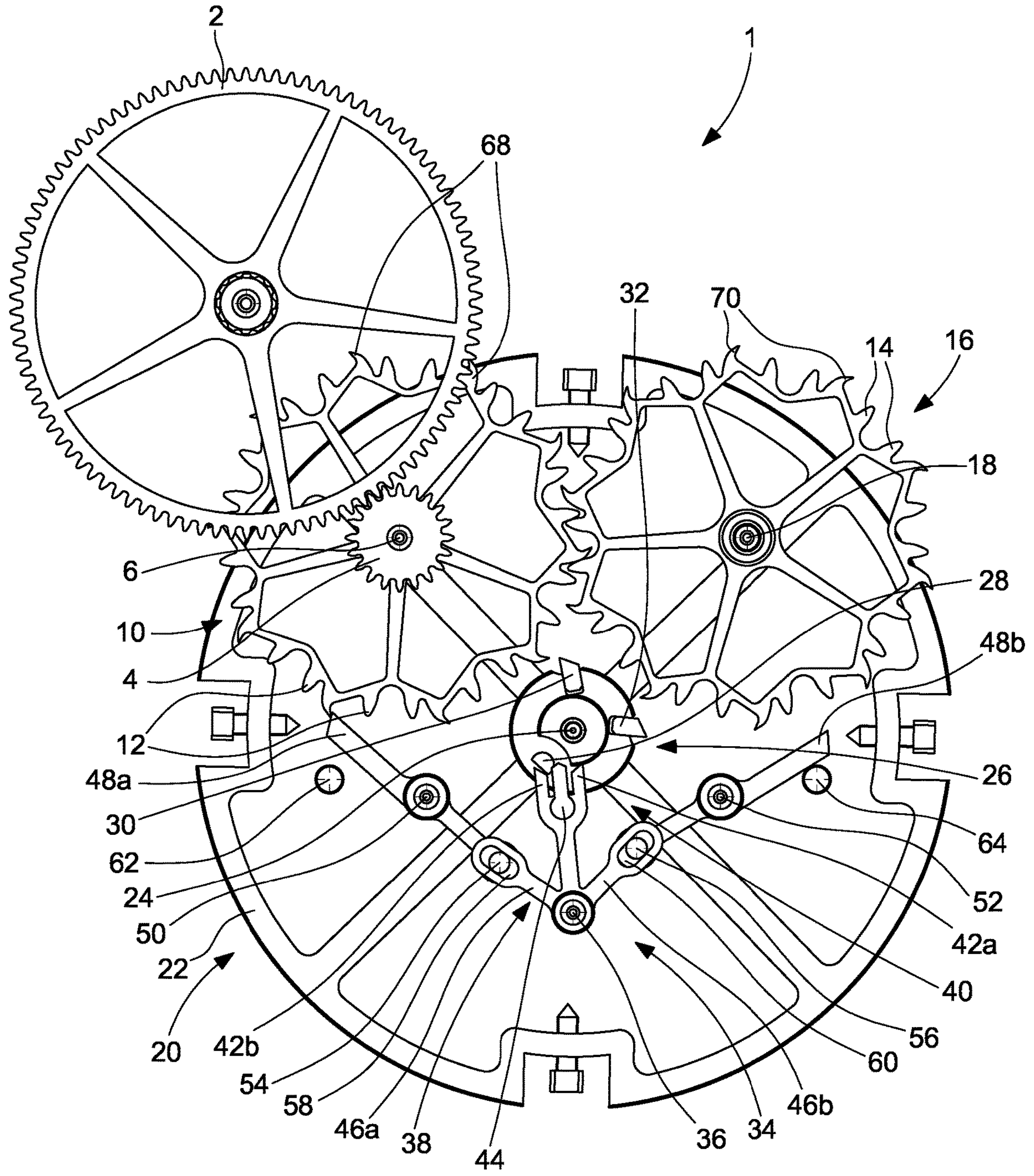
FIG. 7 is a top view of the natural escapement in its position wherein the first escape wheel presses on the first lever, which marks the end of the second drop, whereas the balance plate finishes its alternation freely.

Finally, FIG. 7 is a top view of the natural escapement 1 in its other locking position wherein the first escape wheel 10 presses on the first lever 48*a*, which marks the end of the second drop, whereas the balance plate 26 finishes its alternation freely by rotating in the clockwise direction. The following alternation during which the balance plate 26 will rotate in the anti-clockwise direction reproduces the same functions as those illustrated in FIGS. 2 to 7 symmetrically in the reverse order.

Figure 8:
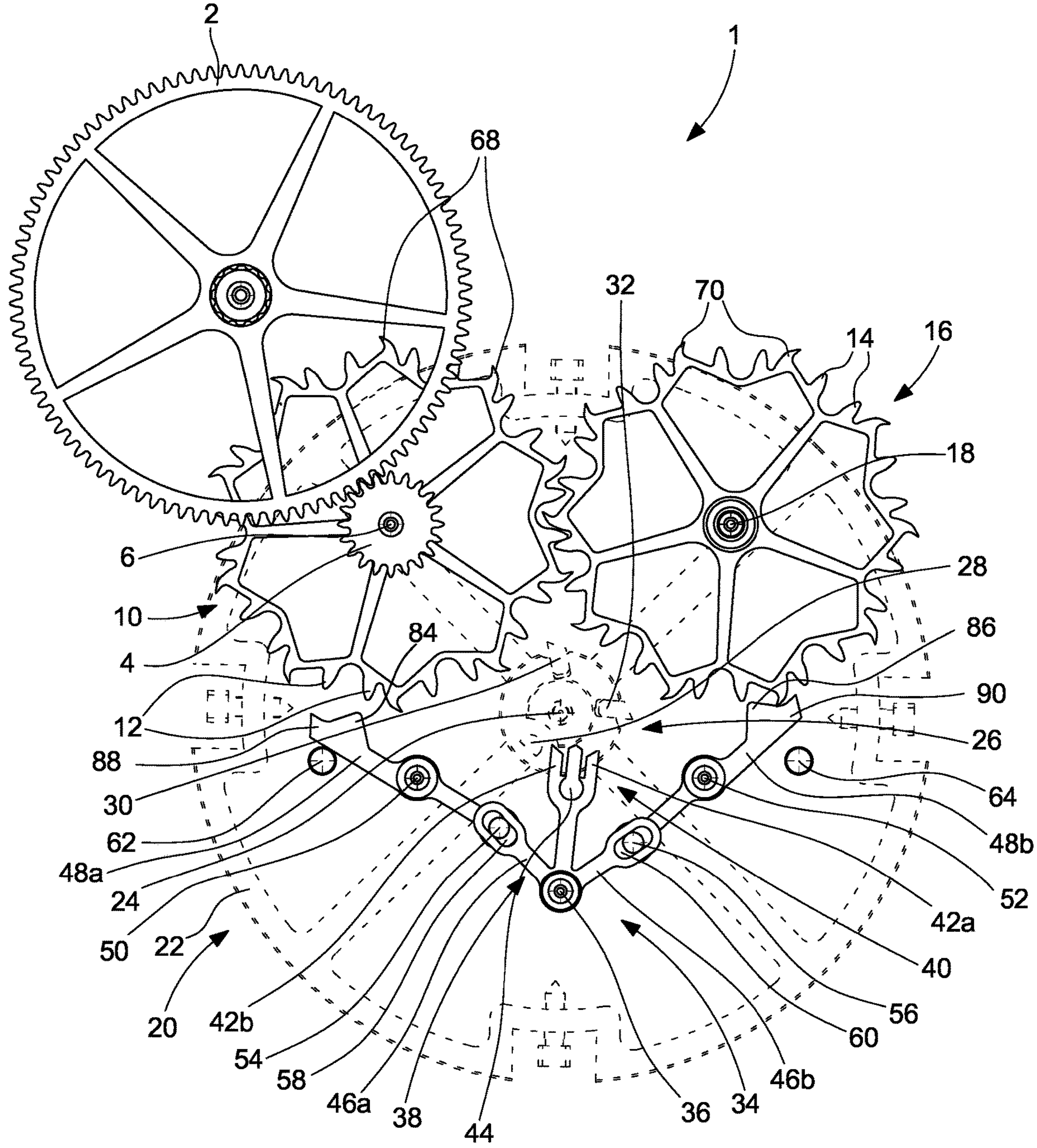
FIG. 8 is a top view of a natural escapement according to an implementing mode of the invention in the case where the balance wheel has been removed, the anchor being provided with safety levers in accordance with the invention, the natural escapement being in the position wherein the second escape wheel, by action on the second safety lever, will cause the anchor to pivot to ensure the locking of the first escape wheel by pressing, via one of the teeth of its impulse and locking toothing, on the portion of this anchor that, usually, that is to say when the balance plate is present, ensures the function of a first stop pallet-stone to temporarily lock the first escape wheel during an operating cycle of the natural escapement.

FIG. 8 is a top view of the natural escapement 1 of FIG. 1 in the case where the balance 20 has been removed, situation schematically illustrated by showing the balance 20 in a dotted line. In accordance with the invention, the first and second levers 48*a*, 48*b* of the anchor 34 are provided respectively with a first safety lever 84 and with a second safety lever 86. As can be seen in this FIG. 8, the natural escapement 1 is in the position wherein the second escape wheel 16 will, by pivoting in the clockwise direction, act by one of the teeth of its impulse and locking toothing 70 on the second safety lever 86 carried by the second lever 48*b* and cause the anchor 34 to pivot to ensure the locking of the first escape wheel 10 by pressing on one of the teeth 66 of its impulse and locking toothing 68 on the portion 88 of this anchor 34 that, usually, that is to say when the balance plate 26 is present, ensures the function of a first stop pallet-stone to temporarily lock the first escape wheel 10 during an operating cycle of the natural escapement 1.

The situation described above is illustrated in FIG. 10 wherein, the balance 20 still being absent, the first escape wheel 10 is locked by pressing on one of the teeth 66 of its impulse and locking toothing 68 on the portion 88 of the anchor 34 that ensures the function of stop pallet-stone. Indeed, under the effect of the pivoting of the anchor 34 caused by the rotation of the second escape wheel 16, the portion 88 of the anchor 34 that ensures the function of stop pallet-stone is in the perimeter of rotation of the first escape wheel 10 and the first escape wheel 10 comes by one of the teeth 66 of its impulse and locking toothing 68 to press against this portion 88 of the anchor 34.

Figure 9:
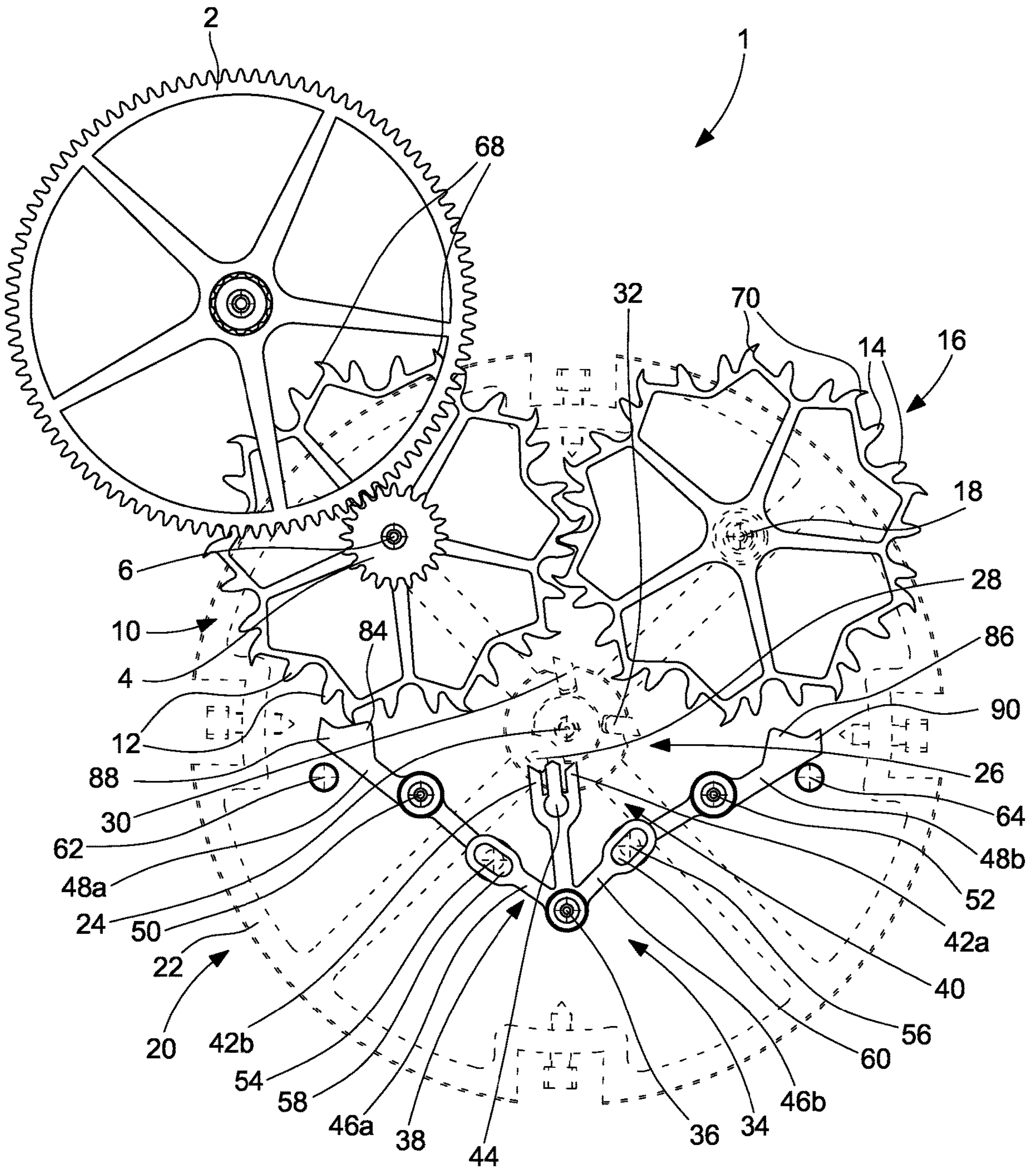
FIG. 9 is a top view similar to that of FIG. 8 wherein, in the absence of the balance wheel, the first escape wheel will, by action on the first safety lever, cause the anchor to pivot so as to make it possible for the second escape wheel to come into locking position by pressing on one of the teeth of its impulse and locking toothing on the portion of this anchor that, usually, ensures the function of a second stop pallet-stone the role of which is to temporarily lock this second escape wheel.
Figure 10:
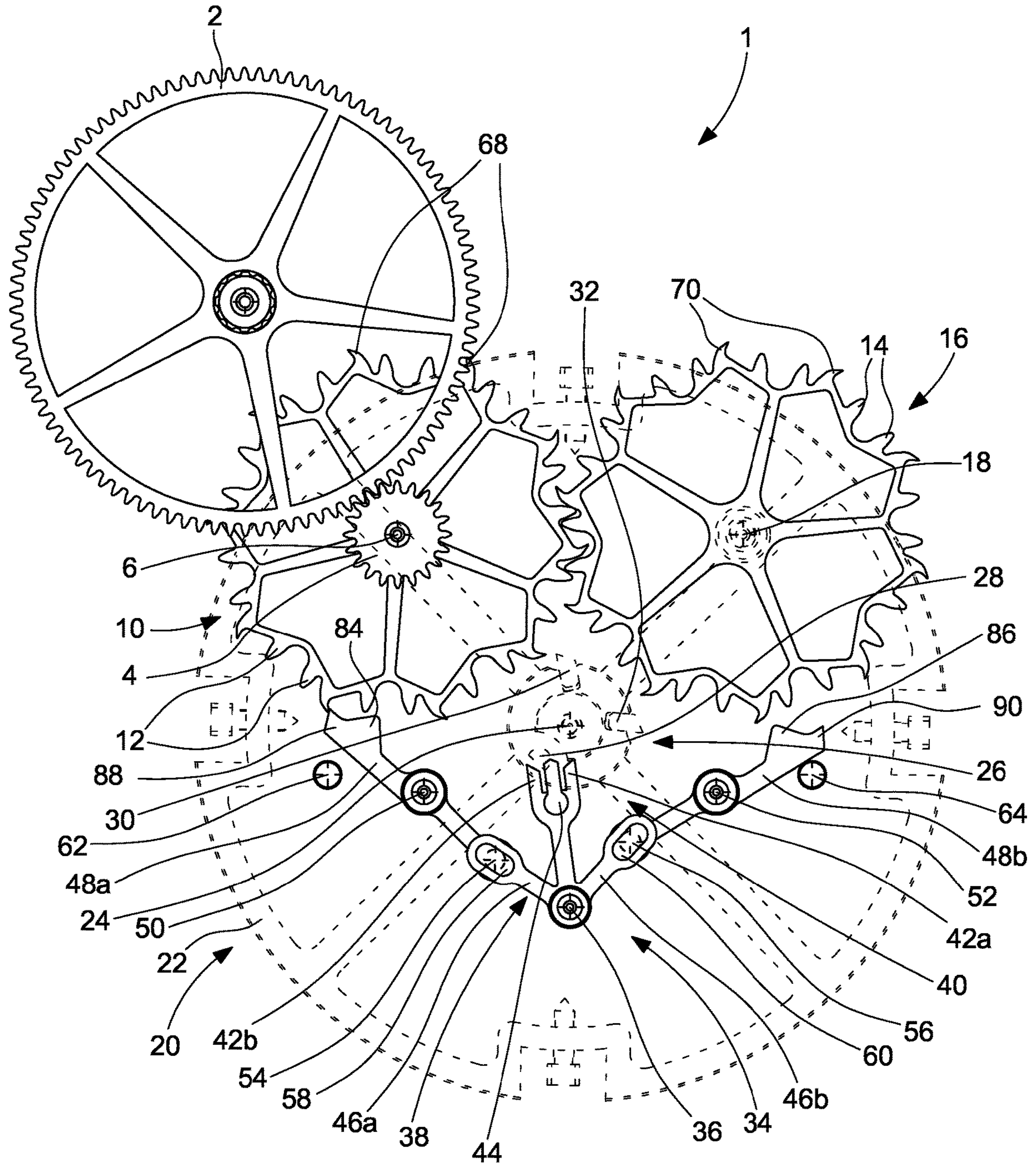
FIG. 10 is a top view that illustrates the position of the natural escapement after the position wherein this natural escapement is in FIG. 8 and wherein, the balance wheel being absent, the second escape wheel has, by action on the second safety lever, caused the anchor to pivot so as to make it possible for the first escape wheel to take its locking position by pressing on one of the teeth of its impulse and locking toothing on the portion of this anchor that, usually, that is to say when the balance plate is present, ensures the function of a first stop pallet-stone to temporarily lock the first escape wheel during an operating cycle of the natural escapement.

Finally, the situation illustrated in FIG. 9 is symmetrical with that shown in FIG. 8, namely that it is the first escape wheel 16 that, by pivoting in the anti-clockwise direction, will act on the first safety lever 84 carried by the first lever 48*a* and cause the anchor 34 to pivot to ensure the locking of the second escape wheel 10 by pressing on one of the teeth of its impulse and locking toothing 70 on the portion 90 of this anchor 34 that, usually, that is to say when the balance plate 26 is present, ensures the function of a second stop pallet-stone to temporarily lock the second escape wheel 16 during an operating cycle of the natural escapement 1.

It goes without saying that the present invention is not limited to the embodiment that has just been described, and that miscellaneous modifications and simple variants may be envisaged without departing from the scope of the invention as defined by the appended claims. In particular, it will be understood that, although the natural escapement 1 has been described in connection with an anchor 34 to the arms 46*a*, 46*b* of which are connected the first and second levers 48*a*, 48*b*, it is absolutely possible, in a simplified embodiment, to only provide for a single lever pivotingly connected to one of the arms of the anchor, the other lever being made integrally with the second arm of the anchor 34. It will also be noted that the presence of the first and second levers 48*a*, 48*b* is not essential, the anchor 34 only being able to include the arms 46*a*, 46*b*, the first arm 46*a* having a geometry that ensures the function of a first stop pallet-stone to temporarily lock the first escape wheel 10 during an operating cycle of the natural escapement 1, and the second arm 46*b* a geometry that ensures the function of a second stop pallet-stone to temporarily lock the second escape wheel 16 during the same operating cycle of the natural escapement 1. It will also be noted that a reduction wheel set may be disposed between the second wheel 2 and the first escape wheel 10. The first escape wheel 10 comprises a first drive toothing 12 whereby it meshes with a second drive toothing 14 of the second escape wheel 16. Likewise, the first and second escape wheels 10, 16 each comprise an impulse and locking toothing 68, 70 whereby they provide a direct and tangential driving impulse to the balance plate 26. The drive 12, 14 and impulse and locking toothings 68, 70 of each of the first and second escape wheels 10, 16 extending in a single plane or in two parallel planes. Preferably, the first and second escape wheels 10, 16 are each one-piece.

NOMENCLATURE

1. Natural escapement
2. Second wheel
4. Pinion
6. Arbor
10. First escape wheel 12. First drive toothing
14. Second drive toothing
16. Second escape wheel
18. Arbor
20. Balance
22. Balance wheel
24. Arbor
26. Balance plate
28. Balance pin
30. First impulse pallet-stone
32. Second impulse pallet-stone
34. Anchor
36. Anchor-staff
38. Anchor body
40. Fork
42*a*. First horn
42*b*. Second horn
44. Dart
46*a*. First arm
46*b*. Second arm
48*a*. First lever
48*b*. Second lever
50. Pivot pin
52. Pivot pin
53. Pivoting articulations
54. Catch
55. Catch
56. Catch
57. Circular opening
58. Oblong opening
60. Oblong opening
62. First limit banking-pin
64. Second limit banking-pin
66. Tooth
68. Impulse and locking toothing
70. Impulse and locking toothing
76. Eccentrics
84. First safety lever
86. Second safety lever
88. Portion
90. Portion

The invention claimed is:

1. A natural escapement for horological movement carrying out a succession of operating cycles each comprising a first and of a second alternation of a balance during which the balance moves from a first extreme position to a second extreme position by passing through a middle rest position, then from its second extreme position to its first extreme position by passing again a second time through its middle rest position, said balance comprising a balance wheel on an arbor of which is adjusted a balance plate, said natural escapement comprising a first escape wheel set having at least one first toothing, said first escape wheel set, arranged to be driven by a wheel set of the train of the horological movement, driving in turn a second escape wheel set having at least one second toothing, the first and second escape wheel sets forming a kinematic chain arranged to cooperate with an anchor capable of pivoting about an anchor-staff, the balance plate causing the anchor to pivot with each of the first and second alternations, said anchor being arranged to lock respectively the first and the second escape wheel set temporarily during the second and first alternations of an operating cycle, the anchor further comprising a first, respectively a second safety lever, these first and second safety levers being arranged so that, in the absence of the balance, one or other of the second and first escape wheel sets, by driving the second or the first safety lever, causes the anchor to pivot to ensure the locking of the first or of the second escape wheel set by abutment of this said first or of this said second escape wheel set on a portion of the anchor that ensures the function of a stop pallet-stone of said first or of said second escape wheel set during normal operation of the escapement, the first and second safety levers being arranged so as not to be in contact with the first and second escape wheel sets during normal operation of the escapement during which it is the balance plate that causes the anchor to pivot.

2. The natural escapement according to claim 1, wherein the anchor comprises a first and a second arm arranged to lock respectively the first and the second escape wheel set temporarily during the second and first alternations of an operating cycle, the first safety lever being arranged on the first arm of the anchor, whereas the second safety lever is arranged on the second arm of the anchor.

3. The natural escapement according to claim 2, wherein at least one first lever, pivoted about a pivot pin and whereon is arranged the first safety lever, is connected to the first arm of the anchor via at least one pivoting articulation, the anchor comprising a second lever that extends its second arm and whereon is arranged the second safety lever, these first and second levers being arranged to lock respectively a first and second escape wheel that are included in the first and second escape wheel sets temporarily during second and first alternations of an operating cycle, the pivoting displacement of the first and second levers being limited.

4. The natural escapement according to claim 3, wherein the balance plate carries a first impulse pallet whereby said balance plate receives a direct and tangential driving impulse from the first escape wheel set during the first alternation, and a second impulse pallet-stone whereby said balance plate receives a direct and tangential driving impulse from the second escape wheel during the second alternation.

5. The natural escapement according to claim 2, wherein the balance plate carries a first impulse pallet whereby said balance plate receives a direct and tangential driving impulse from the first escape wheel set during the first alternation, and a second impulse pallet-stone whereby said balance plate receives a direct and tangential driving impulse from the second escape wheel during the second alternation.

6. The natural escapement according to claim 2, wherein the balance plate carries a balance pin whereby said balance plate causes the anchor to pivot with each of the first and second alternations.

7. The natural escapement according to claim 6, wherein the first and second levers are pivoted about the respective pivot pins and are connected respectively to the first and second arms of the anchor via at least one pivoting articulation.

8. The natural escapement according to claim 7, wherein the at least one of the pivoting articulations are each formed of a catch that protrudes in an oblong opening.

9. The natural escapement according to claim 8, wherein the pivoting displacement of the anchor is limited by first and second limit banking-pins.

10. The natural escapement according to claim 7, wherein the pivoting displacement of the anchor is limited by first and second limit banking-pins.

11. The natural escapement according to claim 6, wherein the pivoting displacement of the anchor is limited by first and second limit banking-pins.

12. The natural escapement according to claim 11, wherein the first and second limit banking-pins are pegs.

13. The natural escapement according to claim 11, wherein the first and second limit banking-pins are machined in a fixed element of the horological movement.

14. The natural escapement according to claim 11, wherein the first and second limit banking-pins are eccentrics.

15. The natural escapement according to claim 6, wherein the pivoting displacement of the anchor is limited by first and second limit banking-pins.

16. The natural escapement according to claim 6, wherein the first lever is made of one part and has a geometry that ensures the function of a first stop pallet-stone to temporarily lock the first escape wheel during the second alternation, and the second lever is made of one part and has a geometry that ensures the function of a second stop pallet-stone to temporarily lock the second escape wheel during the first alternation.

17. The natural escapement according to claim 6, wherein the first escape wheel comprises a first drive toothing whereby it meshes with a second drive toothing of the second escape wheel, and in that wherein the first and second escape wheels each comprise an impulse and locking toothing whereby they provide a direct and tangential driving impulse to the balance plate, the drive and impulse and locking toothings of each of the first and second escape wheels extending in a single plane or in two parallel planes.

18. The natural escapement according to claim 17, wherein the first and second escape wheels are each one-piece.

19. The natural escapement according to claim 6, wherein the anchor comprises a fork formed of a first and of a second horn, the balance plate coming to abut by its balance pin against the second horn of the fork and causing this said anchor to pivot in a first direction during the first alternation, and against the first horn during the second alternation, causing the anchor to pivot in a second direction opposite to the first.

20. The natural escapement according to claim 19, wherein the fork carries a dart that cooperates with the balance plate to prevent the accidental movements of the fork during a period called supplementary arc.

21. The natural escapement according to claim 6, wherein it comprises a reduction wheel set arranged to be disposed between the train of the horological movement and the first escape wheel.

22. A horological movement comprising a natural escapement according to claim 1.

23. The horological movement according to claim 22, wherein the train of said horological movement which drives the first escape wheel is a second wheel.

* * * * *